Sept. 15, 1942.   W. C. PLATT   2,296,004
METHOD FOR THE RECOVERY OF ESSENTIAL OILS
Filed Nov. 20, 1940
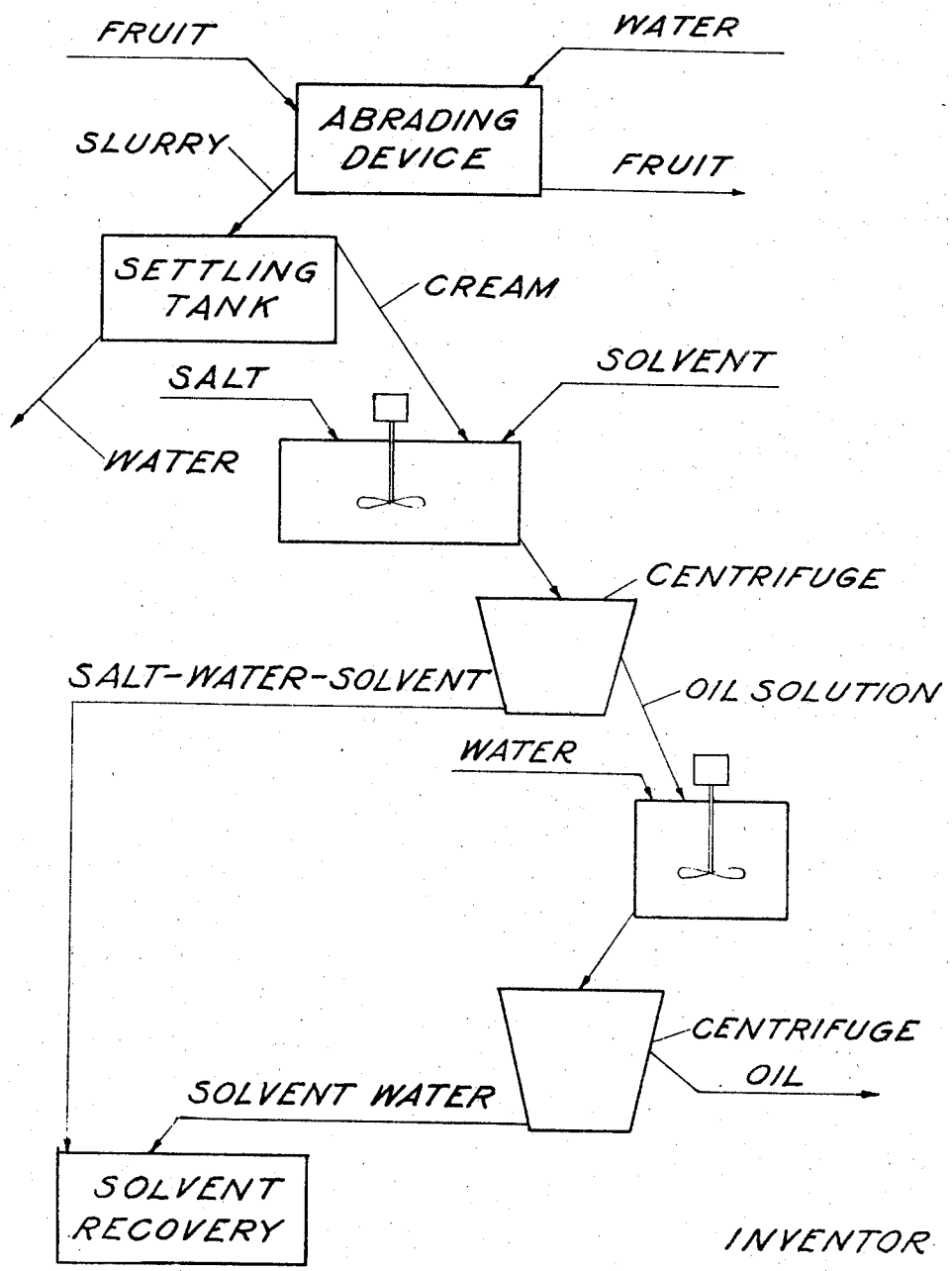
INVENTOR
William C. Platt
per Robert E. Harris
Attorney Patented Sept. 15, 1942

2,296,004

UNITED STATES PATENT OFFICE 2,296,004

METHOD FOR THE RECOVERY OF ESSENTIAL OILS

William Carrington Platt, Ontario, Calif., assignor to California Fruit Growers Exchange, Los Angeles, Calif., a corporation of California Application November 20, 1940, Serial No. 366,496

12 Claims. (Cl. 260—236.6)

This invention relates to the extraction or recovery of essential oil from the material with which it is associated, and more particularly, deals with a process for obtaining citrus oil from the various citrus fruits.

An object of my invention is to provide a method whereby a high percentage of the oil contained in citrus fruit may be recovered.

Another object is to produce an essential oil having, for some purposes, more valuable characteristics than oil now produced.

A further object is to provide a method whereby essential oil may be recovered from an aqueous slurry obtained by abrasion of oil-containing material in the presence of water.

The drawing represents the process in a preferred form.

In general, my process involves recovering essential oil from an aqueous slurry obtained from the oil-bearing substance. Since I have perfected my invention as a method for obtaining citrus oils and especially orange oil, it will be in the interests of clarity to describe the process as applied to oranges, though obviously it is of wider utility.

Briefly, then, the oranges are treated to rupture the oil cells of the outer skin. This is done in the presence of water, and a slurry containing the oil and some skin solids is produced. The oil in this slurry is concentrated by allowing the lighter oil-bearing layer to rise to the top, and the "cream" thus obtained is treated with a solvent to dissolve the oil. Addition of a salt to saturate all water present in the cream will result in the separation of two layers, one a solvent layer containing substantially all the oil. This may be termed a "salting-out" of the oil solution. This oil solution is removed from the other layer and is then treated with water, which gives a separation of the oil from the solvent, whence the oil may be easily recovered.

The following specific process, which has been found to give excellent results, is given as an example.

Oranges are introduced into a device for freeing the oil from the cells contained in the outer skin. The oranges are floated in water, and an abrading and puncturing surface punctures the cells, freeing the oil, and at the same time removing a quantity of solid skin material. The oil and skin material become suspended in the water. The device and its operation form the subject of a prior application by me, Serial No. 342,274, filed June 25, 1940, now Patent No. 2,294,128, and application Serial No. 410,411, filed September 11, 1941, and are not claimed, per se, in this application. The device operates on a continuous basis, with constant addition of oranges and water, and discharge of abraded fruit and slurry.

The slurry, containing the oil from the fruit, is pumped to settling tanks and allowed to remain undisturbed until "creaming" takes place. An optimum temperature for this separation is 37° C. Temperatures lower than about 30° C. may result in incomplete separation, thus lowering the yield, while above 41° C. may result in putrefaction, and/or in volatilization of lighter fractions, which reduces the quality and yield. The water layer ordinarily contains a negligible proportion of oil, and may be drawn from below the "cream" and sewered. The time necessary for satisfactory separation ("creaming") will ordinarily be from 8 to 12 hours.

While the composition of the slurry will vary greatly with the type and condition of the fruit, the season, etc., the cream separated will approximate 30% of the total volume of slurry, and may contain up to about 10 parts of oil by volume per 100 parts cream. The oil content will be determined by analysis.

To the cream, the oil content being known, is added sodium chloride and isopropyl alcohol in the proper amounts. These amounts are: (1) enough salt to saturate the water in the cream and in the alcohol (in case 100% alcohol is not used) and leave a little solid salt in the mixture; and (2) enough isopropyl alcohol to equal about twice the known volume of oil plus enough to saturate (about 15%) the final salt-water. Alcohol in quantities substantially smaller than the optimum will give less complete solution of the oil, while excess alcohol is uneconomic and without added advantage. Further, more alcohol will necessitate the use of a larger quantity of water in the second separation, with increased centrifuge operation and a greater alcohol recovery cost. While the amount of alcohol may vary, the quantity specified has been found to give good results without excessive loss. Less salt than enough to secure saturation of all water will give rise to loss of oil in the waste water.

For example, to 150 gallons of cream, containing 8% oil by volume, will be added 55 gallons of 82% isopropyl alcohol and 420 pounds of salt. These figures may be arrived at in the following manner. The cream contains $.08 \times 150 = 12$ gallons of oil. This amount of oil requires 24 gallons of 100% isopropyl alcohol $+ .15 \times (150-12)$ or 21 gallons to saturate the salt water. $45 \div .82$ gives 55 gallons of 82% alcohol, the total quantity of water now being $138 + 10$, or roughly 150 gallons requiring about 2.8 lbs./gal. to insure saturation, or 420 lbs. of salt. This method of calculating, while not exact, is satisfactory. For an equal amount of cream with only 6% oil, 48 gallons of 82% isopropyl alcohol will be used. If, in the two creams above, 100% isopropyl alcohol is used, the quantities will be 45 and 39 gallons respectively, and the salt requirement will be reduced to 370 pounds.

After thorough agitation of the mixture, two layers will separate, one a salt water phase, the other an alcohol-oil phase. The separation is not complete, and preferably the mixture is run through a centrifuge. The salt water phase will contain around 15% alcohol and a negligible amount of oil, and may be treated to recover the alcohol. The alcohol-oil phase will contain substantially all the oil from the cream.

This alcohol-oil solution is then separated into water-alcohol and oil phases by addition of approximately twice its volume of water and thorough stirring. The oil may be isolated by any common means, for example, by a centrifuge, and purified, and the alcohol recovered by distillation. It is desirable to use as little water as will give good separation, since excess water will increase the expense of recovering the alcohol. In this connection, it is pointed out that solvents freely miscible with water will require less water than those only partially miscible. In the second separation (oil from solvent-water) as well as in the first (salt water from oil solution), conditions will vary. The separation will not be 100%, but there will be a certain amount of emulsification, and the best plan is generally to stir the mixture and centrifuge, though sometimes a rough separation may be made by decanting.

The process thus involves essentially (1) treating a watery suspension of essential oil with a solvent for the oil, which solvent is at least partially miscible with water, but substantially immiscible with saturated salt solution, (2) saturating the water with a salt which will cause the solvent to separate from the salt water, and (3) causing separation of the oil from the solvent by addition of water.

While the specific example has described the use of sodium chloride and isopropyl alcohol, other solvents and salts are satisfactory, and the proper combination of salt and solvent would be indicated by considerations such as relative costs of the materials, disposal of waste salt solution, solvent recovery, etc.

As is indicated in the following table, not all combinations of salt and solvent will be effective. In general, the solvents are more limited than the salts. Alkali and alkaline earth salts appear to be most useful, heavy metal salts being, in general, less effective. The table shows by plus (+) marks that a saturated aqueous solution of the salt would give two definite layers when mixed with the solvent. Minuses indicated failure of separation. Blanks indicate that the combinations were not tried.

| Salt \ Solvent | Ethyl methyl ketone | Sec. amyl alcohol | Sec. butyl alcohol | Tert. butyl alcohol | N-propyl alcohol | Isopropyl alcohol | Ethyl alcohol |
|---|---|---|---|---|---|---|---|
| Sodium carbonate | + | + | + | + | + | + | + |
| Sodium phosphate (prim.) | + | + | + | + | + | + | + |
| Sodium acetate | + | + | + | + | + | + | − |
| Sodium chloride | + | + | + | + | + | + | − |
| Sodium citrate | + | + | + | + | + | + |  |
| Sodium nitrate | + | + | + | + | + | − |  |
| Sodium sulphate | + | + | + | + | + | + | − |
| Calcium chloride | + | + | + | + | + | + | − |
| Ferric chloride | + | + | + | + | + | − |  |
| Nickelous chloride | + | − | + | + | − | − |  |
| Cupric sulphate | + | + | − | − | − | − |  |
| Sodium bicarbonate | + |  |  |  |  |  |  |
| Zinc chloride | − | + | − | − | − |  |  |

In centrifugal separating processes for recovering orange oil from an impure emulsion, such as that produced by abrasion of the peel in the presence of water, there forms in the bowl of the centrifuge a muck which must be cleaned out at frequent intervals. This muck contains some water and a considerable quantity of oil, which is usually lost, due to the difficulty of recovery. I wish to point out that my process as disclosed above may also be practiced in connection with this muck, by treating said muck with a little water to suspend it, when it corresponds to the material I have called "cream" and may be similarly treated with a solvent and a salt, as previously described. In the claims appended, this muck is to be considered included with the described "cream" in the terms aqueous suspension and slurry. The muck referred to here will collect in the first centrifuge, as shown in the accompanying flow sheet, and also, though in smaller quantity, in the second centrifuge. The retreatment of this muck will obviously increase the yield of oil obtained.

If sufficient care has been used in the practice of my process as above described, the oil from the last centrifuge will need no further treatment. If, however, it is desirable to remove some remaining trace of the solvent and/or water, warming under vacuum may be resorted to. Another possibility is to heat the oil to about 150° F. and re-centrifuge.

Numerous processes are known for recovery of essential oils. Cold pressing, that is, crushing the material and expressing the oil, is inefficient. In order to increase yield, the pressed material may be steam distilled. The cold pressed oil is of good quality, while steam-distilled oil is a less desirable product. High temperatures employed during some recovery systems are deleterious to the oil. The use of a low boiling solvent is expensive because of the pressures and temperatures involved.

Oil obtained by my process as disclosed herein is of high quality, being, in the case of orange oil, very stable as to odor and flavor and having a deep red color. These qualities are desirable for uses such as flavoring. Yield is as much as 100% better than cold pressing. Normal atmospheric temperatures prevail throughout most of the process.

It is not necessary that the apparatus or the process of my prior application be used in the present process, nor are the prior apparatus and process limited to a subsequent recovery of the oil by means of solvents. As disclosed in that application, the oil may be obtained from the slurry by centrifugal separation.

It will be apparent that my process, broadly considered, is not limited to the example disclosed, nor to citrus oils. Many other essential oils may be recovered from aqueous mixtures by the solvent method outlined, and such processes as are obvious equivalents are deemed part of my invention as expressed in the appended claims.

I claim:

1. A process for recovering citrus oil from an aqueous mixture comprising adding a water-miscible oil solvent to said mixture, salting out the oil solution from the remainder, separating the two portions, treating the oil solution with water in an amount sufficient to cause stratification into an oil layer and a water-solvent layer, and separating said layers.

2. In the recovery of essential oil from an aqueous suspension, treating said suspension with an oil solvent, which is at least partially miscible with water and a salt which will cause separation into an oil-containing layer and a salt-water layer, separating the two layers, treating the oil-containing layer with water to cause separation of an oil layer and a solvent-water layer, and removing said oil layer.

3. In the recovery of citrus oil from an aqueous slurry containing oil the steps of (1) adding an at least partially water miscible oil solvent to the slurry, (2) adding a salt which will cause separation into salt-water and solvent-oil layers, (3) separating the layers, (4) adding water to the solvent-oil portion to separate solvent-water and oil layers, and (5) separating the oil from the solvent-water portion.

4. A process for recovering essential oil from an aqueous slurry containing said oil comprising adding to said slurry isopropyl alcohol and NaCl, separating the layers thus formed, adding water to the oil-containing portion, and separating the oil from the water-alcohol layer.

5. A process for obtaining citrus oil comprising opening oil-containing cells of citrus fruits in the presence of water; allowing the slurry thus obtained to settle at approximately 37° C. into a cream layer containing the oil, and a water layer; treating this cream with sodium chloride to saturate the contained water and approximately twice as much isopropyl alcohol as there is oil in the cream plus 15% as much isopropyl alcohol as there is water in the cream; separating the layers resulting; treating the oil-containing layer with approximately twice its volume of water to cause separation of alcohol-water and oil layers; and separating the two said layers.

6. A process for obtaining citrus oil comprising opening oil-containing cells of citrus fruits in the presence of water; allowing the slurry thus obtained to settle at approximately 37° C. into a cream layer containing the oil, and a water layer; treating this cream with sodium chloride to saturate the contained water and approximately twice as much tertiary butyl alcohol as there is oil in the cream plus 15% as much tertiary butyl alcohol as there is water in the cream; separating the layers resulting; treating the oil-containing layer with approximately twice its volume of water to cause separation of alcohol-water and oil layers; and separating the two said layers.

7. A process for obtaining citrus oil comprising opening oil-containing cells of citrus fruits in the presence of water; allowing the slurry thus obtained to settle at approximately 37° C. into a cream layer containing the oil, and a water layer; treating this cream with sodium carbonate to saturate the contained water and approximately twice as much normal propyl alcohol as there is oil in the cream plus 15% as much normal propyl alcohol as there is water in the cream; separating the layers resulting; treating the oil-containing layer with approximately twice its volume of water to cause separation of alcohol-water and oil layers; and separating the two said layers.

8. A process for the purification of essential oil comprising dissolving the oil in a solvent which is at least partially miscible with water and separating the oil from the solvent by addition of water to the solution to cause stratification into oil and water-solvent layers.

9. A process for the purification of citrus oil comprising dissolving the oil in a water-miscible solvent and separating the oil from the solvent by addition of water to the solution to cause stratification into oil and water-solvent layers.

10. A process for obtaining citrus oil from solution in isopropyl alcohol comprising addition to the solution of approximately twice its volume of water and separating an oil layer from a water-isopropyl alcohol layer.

11. A process for obtaining citrus oil from solution in tertiary butyl alcohol comprising addition to the solution of approximately twice its volume of water and separating an oil layer from a water-tertiary butyl alcohol layer.

12. A process for obtaining citrus oil from solution in normal propyl alcohol comprising addition to the solution of approximately twice its volume of water and separating an oil layer from a water-normal propyl alcohol layer.

WILLIAM CARRINGTON PLATT.